US012140881B2

(12) United States Patent
Kikushima

(10) Patent No.: US 12,140,881 B2
(45) Date of Patent: Nov. 12, 2024

(54) DEVELOPING DEVICE AND IMAGE FORMING APPARATUS INCLUDING SAME

(71) Applicant: KYOCERA Document Solutions Inc., Osaka (JP)

(72) Inventor: Seiji Kikushima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/348,829

(22) Filed: Jul. 7, 2023

(65) Prior Publication Data

US 2024/0019798 A1 Jan. 18, 2024

(30) Foreign Application Priority Data

Jul. 13, 2022 (JP) ................................. 2022-112356

(51) Int. Cl.

| | |
|---|---|
| ***G03G 15/08*** | (2006.01) |
| ***G03G 9/087*** | (2006.01) |
| ***G03G 15/00*** | (2006.01) |
| ***G03G 15/09*** | (2006.01) |
| ***G03G 21/00*** | (2006.01) |

(52) U.S. Cl.

CPC ..... *G03G 15/0865* (2013.01); *G03G 9/08711* (2013.01); *G03G 9/08755* (2013.01); *G03G 15/081* (2013.01); *G03G 15/0812* (2013.01); *G03G 15/0889* (2013.01);

(Continued)

(58) Field of Classification Search

CPC ............. G03G 15/0865; G03G 15/081; G03G 15/0812; G03G 15/09; G03G 15/50

See application file for complete search history.

(56) References Cited

U.S. PATENT DOCUMENTS 11,513,447 B2 * 11/2022 Takabayashi ...... G03G 21/1814
2006/0251982 A1 * 11/2006 Iwatsuki ............. G03G 9/1133 430/124.1

(Continued)

FOREIGN PATENT DOCUMENTS

JP 2020-095085 A 6/2020

OTHER PUBLICATIONS

'Resistivity of Aluminum Oxide'. The Physics Factbook [online]. Retrieved from the Internet: <https://hypertextbook.com/facts/2006/EuniceHuang.shtml>. (Year: 2006).*

*Primary Examiner* — Carla J Therrien
(74) *Attorney, Agent, or Firm* — Stein IP, LLC

(57) ABSTRACT

A developing device includes a developing device case, a developer carrier, a regulating blade, a magnet member, and a blade magnet. The regulating blade forms a regulating part. Toner contains toner mother particles containing binder resin and magnetic powder, and silica particles and alumina particles adhered to surfaces of the toner mother particles. The alumina particles has a primary particle size of 150 nm or more and 400 nm or less, and resistivity of 0.1 Ωm or more and 2 Ωm or less. The developing device can execute a developer removal mode in which the developer carrier is rotated in a reverse direction opposite to a forward direction that is a rotation direction at image forming time, in a range of 1/18 or more and 1/5 or less of an outer circumference length of the developer carrier, so as to remove the developer staying at the regulating part.

5 Claims, 6 Drawing Sheets

(52) U.S. Cl.
CPC ............. *G03G 15/09* (2013.01); *G03G 15/50* (2013.01); *G03G 21/0011* (2013.01)

(56) References Cited

U.S. PATENT DOCUMENTS

| | | | | | |
|---|---|---|---|---|---|
| 2007/0110482 | A1* | 5/2007 | Kazaki | G03G 15/0818 | 399/284 |
| 2008/0096121 | A1* | 4/2008 | Iwatsuki | G03G 15/0822 | 430/110.2 |
| 2013/0216250 | A1* | 8/2013 | Seki | G03G 15/0818 | 399/53 |
| 2015/0220018 | A1* | 8/2015 | Nanno | G03G 15/0865 | 399/167 |
| 2019/0354032 | A1* | 11/2019 | Obara | G03G 9/1133 | |
| 2020/0110350 | A1 | 4/2020 | Hayashi | G03G 15/0812 | |

* cited by examiner

DEVELOPING DEVICE AND IMAGE FORMING APPARATUS INCLUDING SAME

INCORPORATION BY REFERENCE

This application is based upon and claims the benefit of priority from the corresponding Japanese Patent Application No. 2022-112356 filed Jul. 13, 2022, the entire contents of which are hereby incorporated by reference.

BACKGROUND

The present disclosure relates to a developing device and an image forming apparatus including the same.

Conventionally, as a developing method in an image forming apparatus using an electrophotographic process, there is a general process in which powder developer is mainly used, an electrostatic latent image formed on an image carrier such as a photosensitive drum is visualized by the developer, and the visualized image (toner image) is transferred onto a recording medium, and then a fixing process is performed.

As the developer, there is a magnetic one-component developer containing only magnetic toner. As the developing method using the magnetic one-component developer, there is a jumping one-component developing method. The jumping one-component developing method uses a development roller in which a fixed magnet body having a plurality of magnetic poles is disposed. Utilizing magnetic holding power of this fixed magnet body, the toner inside a development container is carried on the development roller, and a thickness thereof is regulated using a regulating blade. In this way, a thin layer of toner is formed on the surface of the development roller, and the toner is allowed to fly from the development roller to the photosensitive drum at a developing position.

The magnetic one-component developing method as described above needs sufficient magnetic force at the tip of the regulating blade, in order to secure stability of the toner layer on the development roller and to improve toner charging performance. For this purpose, there is a technique to improve magnetic force at the tip of the regulating blade by sticking a blade magnet on a side surface of the regulating blade.

However, if the blade magnet is stuck, aggregated toner is easily generated around the blade magnet and at the tip of the blade in the developing device. As a result, the toner layer on the development roller is disturbed, and an image defect such as a white line can easily occur.

Therefore, there is disclosed an image forming apparatus that executes a first removal mode and a second removal mode, in which aggregated developer between the regulating blade and the development roller is allowed to flow, so that an image defect such as a white line can be suppressed. In the first removal mode, at non-image forming time, a repulsive magnetic field is generated between the regulating blade and the development roller, and the development roller is rotated in a forward direction (the same direction as a rotation direction of the development roller when performing the development). In the second removal mode, the repulsive magnetic field is generated, and the development roller is rotated in a reverse direction (the direction opposite to the forward direction). In this way, clogging of the aggregated developer at the tip of the blade and its vicinity is dissolved, and the image defect described above is hardly generated.

SUMMARY

A developing device according to one aspect of the present disclosure develops an electrostatic latent image formed on an image carrier. The developing device includes a case, a developer carrier, a regulating blade, a magnet member, and a blade magnet. The case stores magnetic one-component developer containing only magnetic toner. The developer carrier is supported in a rotatable manner by the case, and carries the developer on its outer circumference surface. The regulating blade is disposed to have a predetermined space between itself and the developer carrier, and is made of magnetic material forming a regulating part that regulates a layer thickness of the developer carried on the developer carrier. The magnet member is fixed in a non-rotatable manner inside the developer carrier and has a plurality of magnetic poles disposed along the circumferential direction of the developer carrier. The blade magnet is fixed to the regulating blade and induces a magnetic pole at the tip of the regulating blade. The toner contains toner mother particles containing binder resin and magnetic powder, and silica particles and alumina particles adhered to the surfaces of the toner mother particles. The alumina particles have a primary particle size of 150 nm or more and 400 nm or less and a resistivity of 0.1 Ωm or more and 2 Ωm or less. The developing device is capable of executing a developer removal mode in which the developer carrier is rotated in a reverse direction opposite to a forward direction that is a rotation direction at image forming time, in a range of 1/18 or more and 1/5 or less of an outer circumference length of the developer carrier, so as to remove the developer staying at the regulating part.

DETAILED DESCRIPTION

Figure 1:
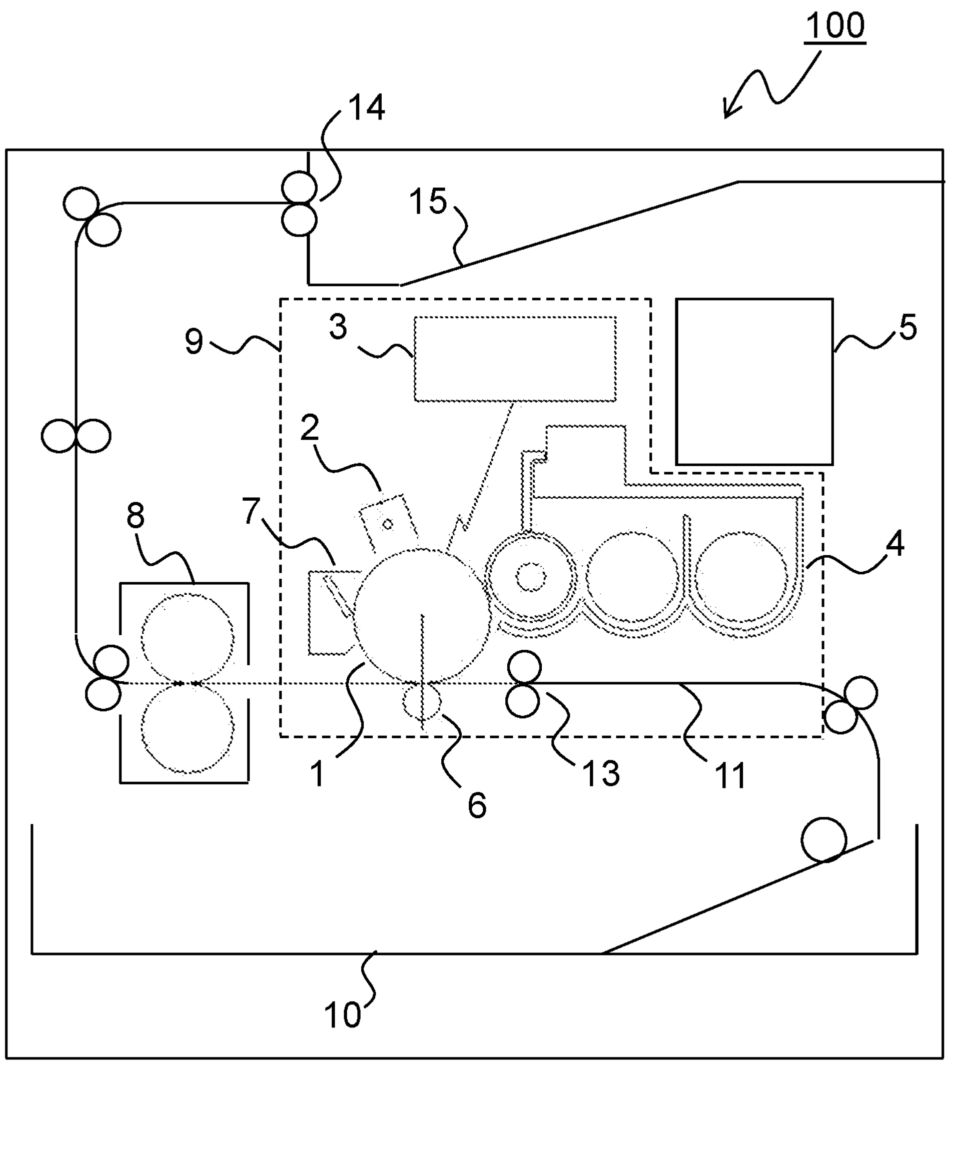
FIG. 1 is a schematic cross-sectional view of an image forming apparatus including a developing device according to one embodiment of the present disclosure.

Hereinafter, an embodiment of the present disclosure is described with reference to the drawings. FIG. 1 is a schematic cross-sectional view of an image forming apparatus 100 including a developing device 4 according to the embodiment of the present disclosure. When the image forming apparatus (such as a monochrome printer) 100 performs printing operation, an image forming unit 9 in the image forming apparatus 100 forms an electrostatic latent image based on document image data received from a host device (not shown) such as a personal computer (hereinafter referred to as PC), and the developing device 4 allows toner Tn to adhere to the electrostatic latent image, so that a toner image is formed. The toner Tn is supplied to the developing device 4 from a toner container 5 (developer storage unit). In the image forming apparatus 100, a photosensitive drum 1 (image carrier) is rotated in a clockwise direction in FIG. 1, while an image forming process is performed on the photosensitive drum 1.

The image forming unit 9 is equipped with a charging device 2, an exposure unit 3, the developing device 4, a transfer roller 6, a cleaning device 7, and a charge elimination device (not shown), which are arranged along a rotation direction of the photosensitive drum 1 (clockwise direction). The photosensitive drum 1 is consisted of an aluminum drum and a photosensitive layer formed thereon, for example, and the surface thereof is charged uniformly by the charging device 2. Further, the surface receives a light beam from the exposure unit 3 described later so that an electrostatic latent image is formed by decreasing the charge. Note that it is preferred to use amorphous silicon (a-Si) or the like that is superior in durability for the photosensitive layer, for example, though this is not a limitation.

The charging device 2 uniformly charges the surface of the photosensitive drum 1. The charging device 2 employs a corona discharge device that discharges by applying a high voltage to a thin wire as an electrode. Note that it may be possible to employ, instead of the corona discharge device, a contact charging device that allows a charging member such as a charging roller to touch the surface of the photosensitive drum 1 so as to apply the voltage. The exposure unit 3 emits the light beam based on the image data to the photosensitive drum 1, so as to form the electrostatic latent image on the surface of the photosensitive drum 1.

The developing device 4 allows the toner Tn to adhere to the electrostatic latent image of the photosensitive drum 1 so as to form the toner image. The developing device 4 stores magnetic one-component developer containing magnetic toner (hereinafter referred to as toner Tn). Details of the developing device 4 and components of the toner Tn will be described later.

The cleaning device 7 includes a cleaning roller, a cleaning blade, or the like that contacts the photosensitive drum 1 in line in a longitudinal direction thereof (in the direction perpendicular to the paper of FIG. 1), and removes the toner Tn remaining on the surface of the photosensitive drum 1, after the toner image is moved (transferred) to a paper sheet.

Toward the photosensitive drum 1 on which the toner image is formed as described above, the paper sheet is conveyed to the image forming unit 9 from a sheet storage unit 10 via a sheet conveying path 11 and a registration roller pair 13, at a predetermined timing. The transfer roller 6 transfers the toner image formed on the surface of the photosensitive drum 1 onto the paper sheet conveyed in the sheet conveying path 11. After that, as preparation of successive formation of a new electrostatic latent image, the cleaning device 7 removes residual toner Tn on the surface of the photosensitive drum 1, and the charge elimination device removes residual charge.

The paper sheet with the transferred toner image is separated from the photosensitive drum 1, and is conveyed to a fixing device 8, in which it is heated and pressed so that the toner image is fixed to the paper sheet. The paper sheet after passing through the fixing device 8 passes through a discharge roller pair 14 and is discharged onto a sheet discharge unit 15.

Figure 2:
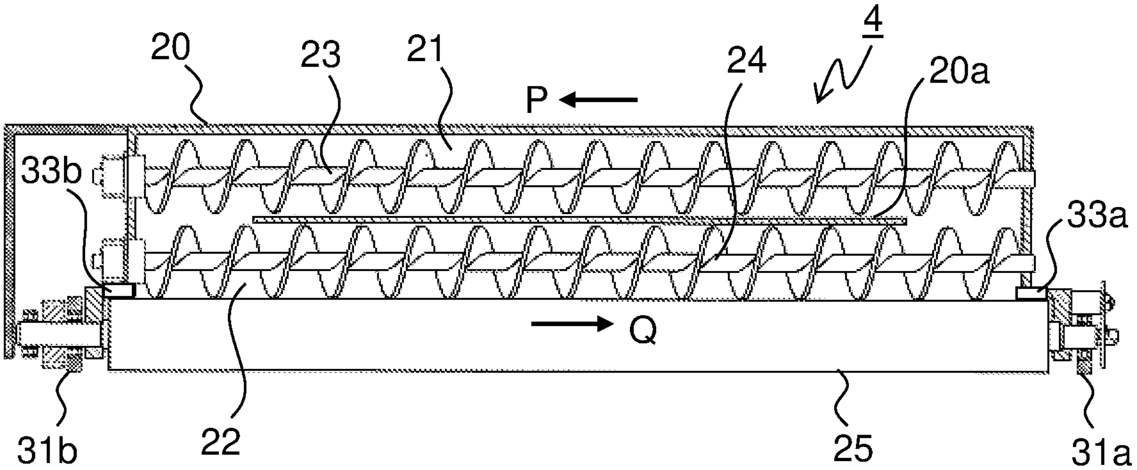
FIG. 2 is a plan view of the developing device according to the embodiment of the present disclosure.
Figure 3:
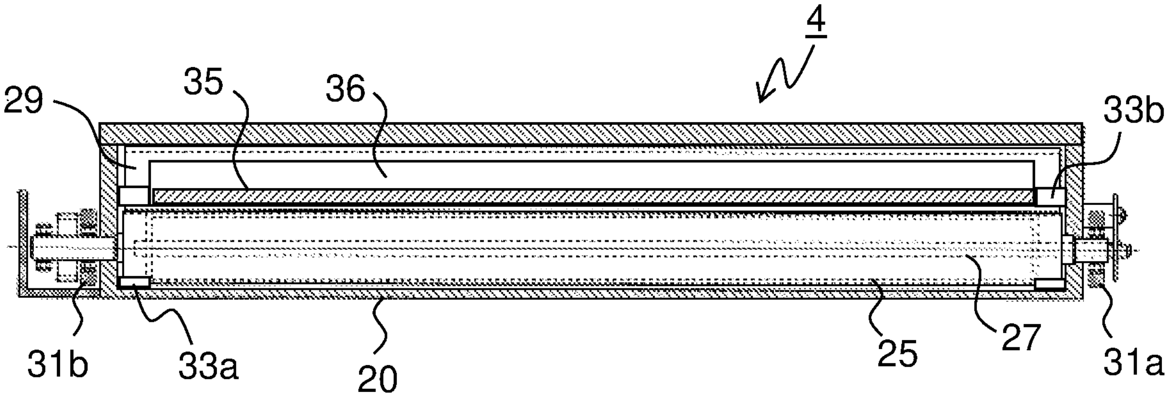
FIG. 3 is a front view of the developing device according to the embodiment of the present disclosure.
Figure 4:
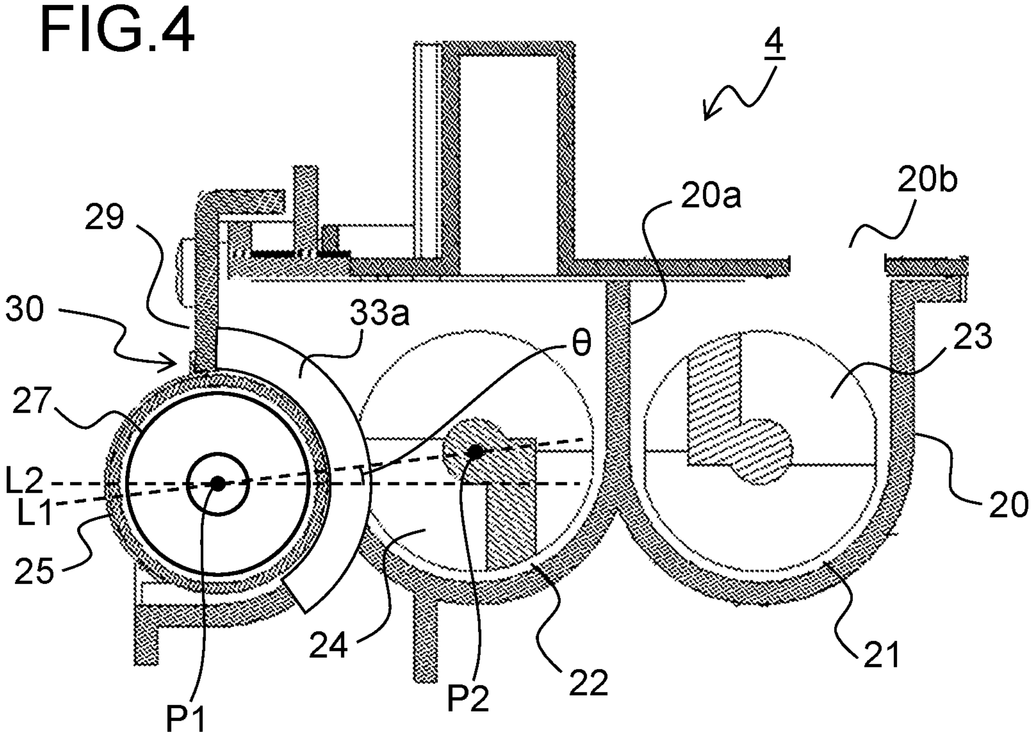
FIG. 4 is a cross-sectional side view of the developing device of the embodiment.

FIGS. 2 and 3 are respectively a plan view and a front view of the developing device 4 according to the embodiment of the present disclosure, and FIG. 4 is a cross-sectional side view of the developing device 4 of the embodiment. Note that FIGS. 2 and 3 illustrate a state where a top cover is removed to make inside visible, for convenience sake. As illustrated in FIGS. 2 to 4, inside a housing 20 is divided into a first storage room 21 and a second storage room 22 by a partition **20*a* formed as one unit with the housing 20. The first storage room 21 is equipped with a first stirring screw 23, and the second storage room 22 is equipped with a second stirring screw 24** (stirring/conveying member).

The first stirring screw 23 and the second stirring screw 24, each of which is configured to include a support shaft (rotation shaft) on which a spiral blade is disposed, are rotatably supported in parallel to each other by the housing 20. The partition **20*a* is not formed at each end portion in the longitudinal direction of the housing 20 that is an axial direction of the first stirring screw 23 and the second stirring screw 24. The first stirring screw 23 stirs the toner Tn in the first storage room 21 and conveys the same in the direction of an arrow P to the second storage room 22. The second stirring screw 24 stirs the toner Tn conveyed to the second storage room 22 and conveys the same in the direction of an arrow Q to supply to a development roller 25** (developer carrier).

The development roller 25 rotates in response to rotation of the photosensitive drum 1 (see FIG. 1), so as to supply the toner Tn to the photosensitive layer of the photosensitive drum 1. Inside the development roller 25, there is secured a fixed magnet body 27 (magnet member) constituted of a permanent magnet having a plurality of magnetic poles. The magnetic force of the fixed magnet body 27 causes the toner Tn to be adhered to (carried on) the surface of the development roller 25 so that a magnetic brush is formed. The development roller 25 is pivoted to the housing 20 in a rotatable manner, so as to be parallel to the first stirring screw 23 and the second stirring screw 24.

Here, a reference straight line L1 is defined as a straight line that passes a rotation center P1 (first rotation center) of the development roller 25 and a rotation center P2 (second rotation center) of the second stirring screw 24. An angle θ between a horizontal line L2 passing through the rotation center P1 and the reference straight line L1 is 0 degrees or more and 75 degrees or less, where the angle is positive in a forward direction from the horizontal line L2 about the rotation center P1, while it is negative in a reverse direction.

A regulating blade 29 has a length in the longitudinal direction (the left and right direction in FIG. 2) that is larger than the maximum development width. The regulating blade 29 is disposed with a predetermined space between itself and the development roller 25. The regulating blade 29 forms a regulating part 30 between the tip of the regulating blade 29 and the outer circumference surface of the development roller 25. The regulating part 30 regulates amount of toner (a layer thickness of toner) supplied to the development roller 25. As material of the regulating blade 29, magnetic stainless steel (SUS) or the like is used.

At the bottom of the second storage room 22 facing the second stirring screw 24, a toner amount detection sensor (not shown) is disposed for detecting amount of toner stored in the housing 20. In accordance with a detection result by this toner amount detection sensor, the toner Tn stored in the toner container 5 (see FIG. 1) is supplied to the housing 20 through a developer supply port **20*b* (developer supply section) disposed at an upper part of the housing 20. Note that the toner container 5 is empty when the apparatus is shipped. Therefore, it is necessary to fill the empty toner container 5** with toner Tn before use. This first filling is referred to as "toner installation".

DS rollers 31*a* and 31*b* are engaged with a rotation shaft of the development roller 25 in a rotatable manner. The DS rollers 31*a* and 31*b* contact with the outer circumference surface of the photosensitive drum 1 at both end parts in the axial direction, so as to strictly regulate distance between the development roller 25 and the photosensitive drum 1. The DS rollers 31*a* and 31*b* have bearings and rotate following the photosensitive drum 1, so that abrasion of the drum surface can be prevented. In addition, the both end parts of the development roller 25 in the axial direction are provided with magnetic seal members 33*a* and 33*b* for preventing leakage of the toner Tn through a gap between the housing 20 and the development roller 25.

Figure 5:
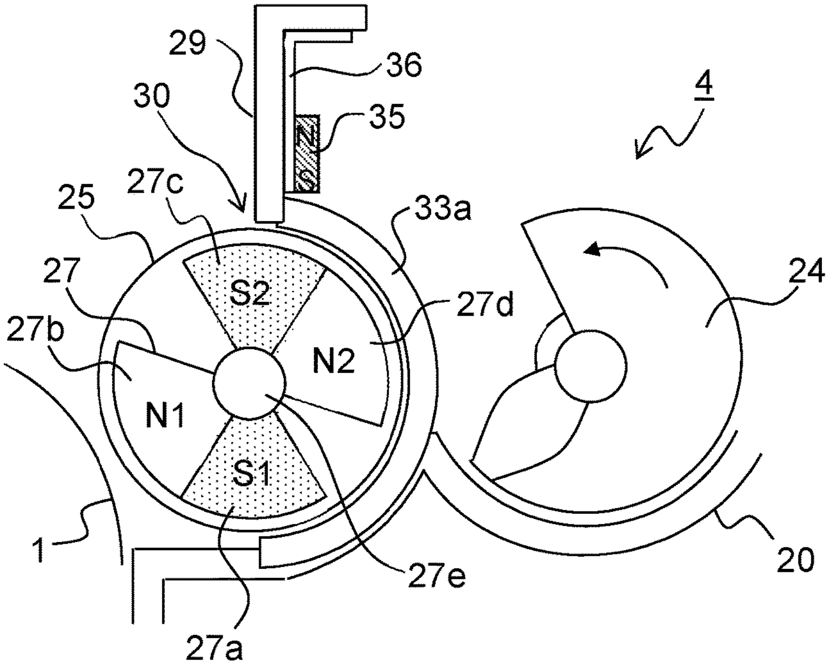
FIG. 5 is an enlarged view of a development roller in the developing device of the embodiment.
Figure 6:
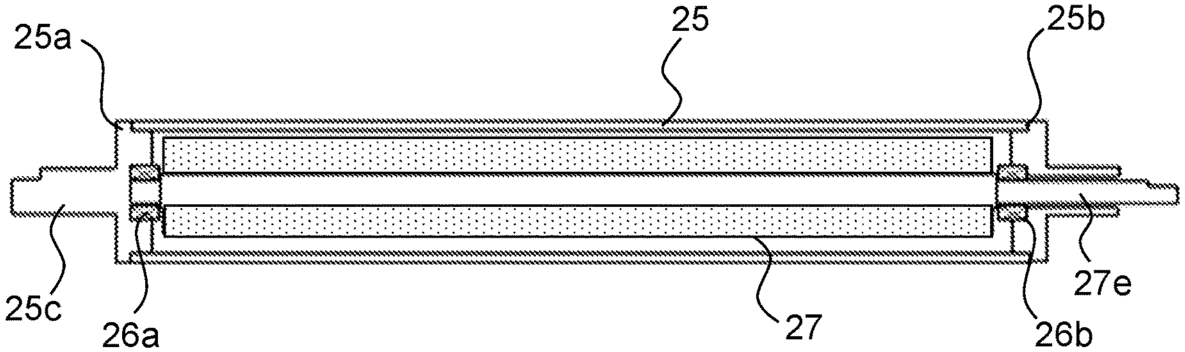
FIG. 6 is a cross-sectional view of the development roller of FIG. 4 viewed from a direction perpendicular to an axial direction thereof.

FIG. 5 is an enlarged view of the development roller 25 and its vicinity in the developing device 4 of the embodiment. FIG. 6 is a cross-sectional view of the development roller 25 of FIG. 5 viewed from a direction perpendicular to the axial direction. As illustrated in FIGS. 5 and 6, the fixed magnet body 27 includes a metal shaft 27*e* to which four magnetic poles 27*a* to 27*d* are fixed, which consists of an S1 pole 27*a*, an S2 pole 27*c*, an N1 pole 27*b*, and an N2 pole 27*d*.

The both end parts of the development roller 25 in the longitudinal direction are provided with flange parts 25*a* and 25*b*, respectively, and the flange part 25*a* is fixed to a drive input shaft 25*c*. One end (the right side end in FIG. 6) of the shaft 27*e* of the fixed magnet body 27 is fixed to the housing 20 (see FIG. 3), and bearings 26*a* and 26*b* are disposed between the shaft 27*e* and the flange parts 25*a* and 25*b*, respectively. When a development drive motor 41 (see FIG. 7) supplies rotation drive force to the drive input shaft 25*c* via a drive input gear (not shown), the development roller 25 rotates together with the flange parts 25*a* and 25*b*, but the fixed magnet body 27 does not rotate.

A blade magnet 35 is provided close to the tip of the regulating blade 29 via a magnet support stay 36. The magnet support stay 36 is supported on a back side (the right side in FIG. 5) of the regulating blade 29.

At image forming time, a tip edge of a magnetic pole 35*a* of the blade magnet 35 is positioned inside the tip of the regulating blade 29 (outside in a radial direction of the development roller 25).

As illustrated in FIG. 2, the blade magnet 35 is disposed over the substantially entire length of the regulating blade 29 in the longitudinal direction (the left and right direction in FIG. 2) between the magnetic seal members 33*a* and 33*b*. The blade magnet 35 contacts with the regulating blade 29 with its south pole downward, and a north pole is induced at the tip of the regulating blade 29. In this way, a magnetic field is generated at the regulating part 30 in the direction that the north pole and the S2 pole (regulating pole) 27*c* of the fixed magnet body 27 are attracted to each other.

This magnetic field forms a magnetic brush that is a row of toner particles between the regulating blade 29 and the development roller 25, and the magnetic brush is regulated to make a desired height of layer when it passes through the regulating part 30. On the other hand, the toner Tn that was not used for forming the magnetic brush remains along a side surface of the regulating blade 29 on an upstream side (the right side). After that, the development roller 25 rotates in a counterclockwise direction so that the magnetic brush moves to an area facing the photosensitive drum 1 (developing area). Then, the N1 pole (main pole) 27*b* applies a magnetic field, and hence the magnetic brush contacts with the surface of the photosensitive drum 1 so as to develop the electrostatic latent image.

As the development roller 25 further rotates in the counterclockwise direction, the S1 pole (transport pole) 27*a* applies a magnetic field this time in a direction along the outer circumference surface of the development roller 25, and the magnetic brush as well as the toner Tn that was not used for forming the toner image is recovered on the development roller 25. Furthermore, at a missing part between the S1 pole 27*a* and the N2 pole 27*d*, the magnetic brush separates from the development roller 25 and drops in the housing 20. Further, the toner is stirred and conveyed by the second stirring screw 24, and then a magnetic field of the N2 pole (pumping pole) 27*d* forms the magnetic brush again on the development roller 25.

The housing 20 surrounding the both end parts of the development roller 25 is provided with the magnetic seal members 33*a* and 33*b* respectively at the both end parts. Note that FIG. 5 shows only the magnetic seal member 33*a*. The magnetic seal members 33*a* and 33*b* are disposed at the both end parts of the development roller 25 in a non-contact state with the development roller 25, i.e., with a predetermined space (gap) to the outer circumference surface of the development roller 25. In addition, the magnetic seal members 33*a* and 33*b* are disposed on the opposite side to the photosensitive drum 1 with respect to the development roller 25.

Figure 7:
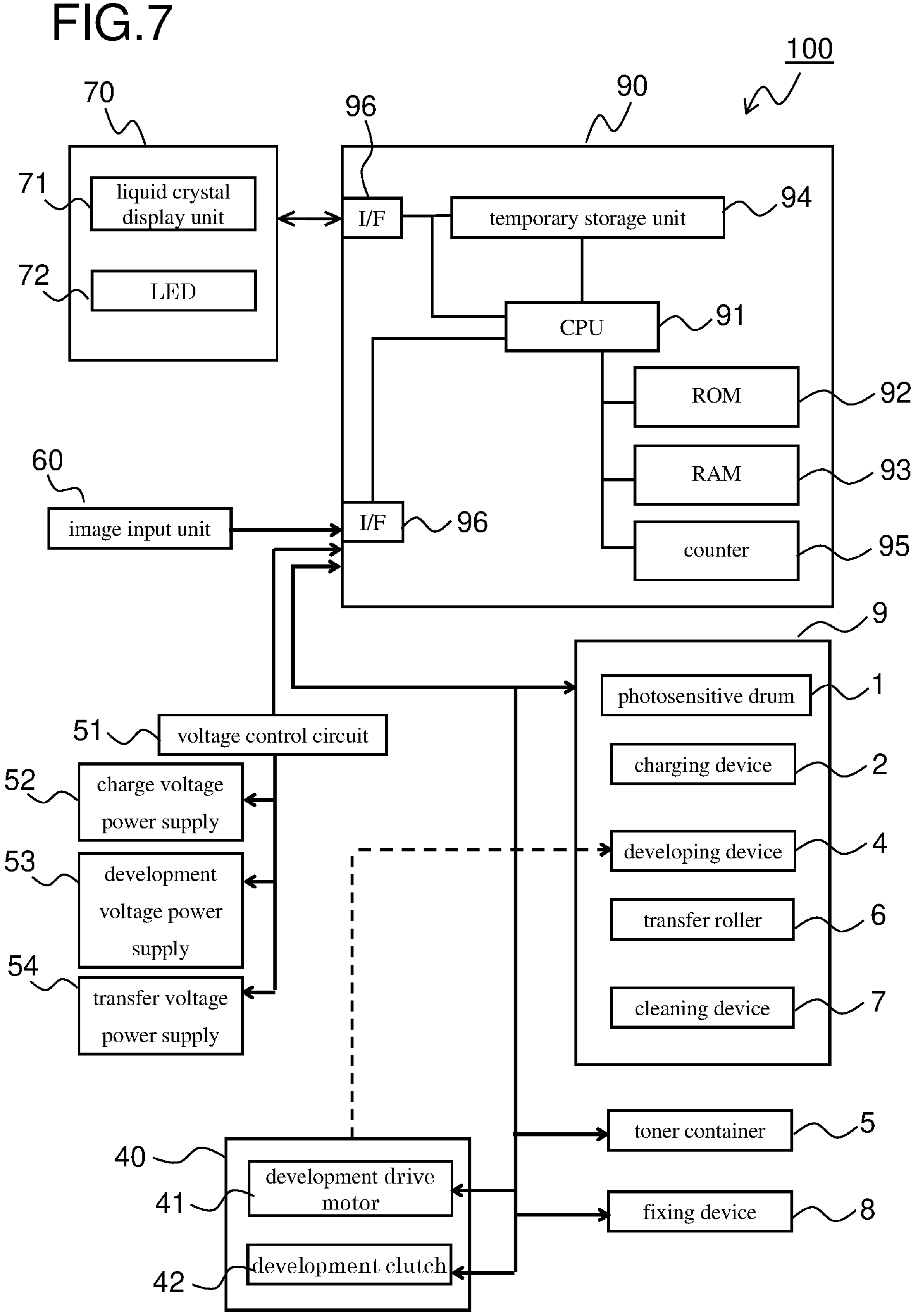
FIG. 7 is a block diagram illustrating an example of a control path used in the image forming apparatus.

FIG. 7 is a block diagram illustrating one example of a control path used in the image forming apparatus 100. Note that, when the image forming apparatus 100 is used, various controls of individual units of the apparatus are performed, and hence the control path of the entire image forming apparatus 100 is complicated. Therefore, in the control path, a part necessary for implementing the present disclosure is mainly described here.

A development drive unit 40 includes the development drive motor 41 and a development clutch 42. The development drive motor 41 rotates the first stirring screw 23, the second stirring screw 24, and the development roller 25. The development clutch 42 turns on and off the rotation drive force input from the development drive motor 41 to the first stirring screw 23, the second stirring screw 24, and the development roller 25.

A voltage control circuit 51 is connected to a charge voltage power supply 52, a development voltage power supply 53, and a transfer voltage power supply 54, so as to activate these power supplies according to output signals from a control unit 90. These power supplies are activated by control signals from the voltage control circuit 51, so that the charge voltage power supply 52 applies a predetermined voltage to the wire in the charging device 2, the development voltage power supply 53 applies a predetermined voltage to the development roller 25 in the developing device 4, and the transfer voltage power supply 54 applies a predetermined voltage to the transfer roller 6.

An image input unit 60 is a receiving unit that receives image data sent from the PC or the like to the image forming apparatus 100. An image signal input from the image input unit 60 is converted into a digital signal, which is then sent to a temporary storage unit 94.

An operation unit 70 includes a liquid crystal display unit 71 and a LED 72 that indicates various states, so as to indicate a state of the image forming apparatus 100 or display an image forming status and the number of printed sheets. Various settings of the image forming apparatus 100 are performed using a printer driver on the PC.

The control unit 90 includes at least a central processing unit (CPU) 91, a read only memory (ROM) 92 that is a storage unit dedicated for reading, a random access memory (RAM) 93 that is a storage unit that can be read and written, the temporary storage unit 94 that temporarily stores image and the like, a counter 95, a timer 97, and a plurality of (e.g., two) interfaces (I/Fs) 96 for sending control signals to individual devices in the image forming apparatus 100 or receiving input signals from the operation unit 70.

The ROM 92 stores a control program for the image forming apparatus 100, numeric values necessary for control, and data or the like that is not changed during use of the image forming apparatus 100. The RAM 93 stores necessary data generated during control of the image forming apparatus 100, and data or the like that is temporarily necessary for control of the image forming apparatus 100. In addition, the RAM 93 (or the ROM 92) also stores the accumulated number of printed sheets in the developing device 4 measured by the timer 97 as described later.

The temporary storage unit 94 temporarily stores the image signal that is input from the image input unit 60 for receiving image data sent from the PC or the like, and is converted into the digital signal. The counter 95 accumulates and counts the number of printed sheets.

In addition, the control unit 90 sends control signals to individual units and devices in the image forming apparatus 100 from the CPU 91 via the I/F 96. In addition, the individual units and devices send signals indicating their states and input signals to the CPU 91 via the I/F 96. The individual units and devices controlled by the control unit 90 includes, for example, the fixing device 8, the image forming unit 9, the development drive unit 40, the voltage control circuit 51, the image input unit 60, and the operation unit 70.

Figure 8:
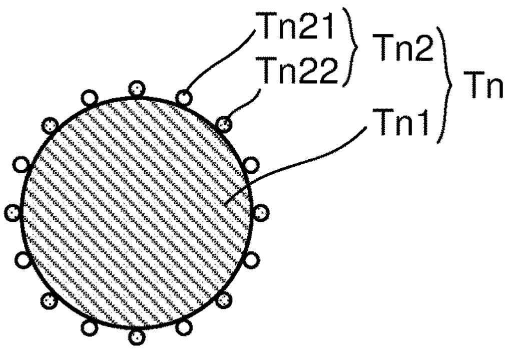
FIG. 8 is an enlarged plan view of toner.

FIG. 8 is an enlarged plan view of the toner Tn. The toner Tn contains toner mother particles Tn1 and external additive Tn2. The toner mother particles Tn1 contain binder resin and magnetic powder. The binder resin is styrene acrylic acid copolymer or polyester.

The external additive Tn2 adheres to surfaces of the toner mother particles Tn1. The external additive Tn2 contains silica particles Tn21 and alumina particles Tn22. The alumina particles Tn22 have a particle size of 150 nm or more and 400 nm or less. The alumina particles Tn22 have a resistivity of 0.1 Ωm or more and 2 Ωm or less.

Here, if flowability of the toner Tn is deteriorated at the regulating part 30 and its vicinity, the toner Tn is concentrated at the regulating part 30 and its vicinity, and regulating force of the regulating part 30 is lowered. The lowering of regulating force of the regulating part 30 causes fluctuation of conveyance amount of the toner Tn on the development roller 25, and can also cause an image defect. Therefore, in this embodiment, a developer removal mode can be executed at non-image forming time. The developer removal mode is executed at least one of first timing after supplying the toner Tn from the toner container 5 until the next print command, and second timing after finishing the print operation until the next print command. Hereinafter, the developer removal mode is described in detail.

Figure 9:
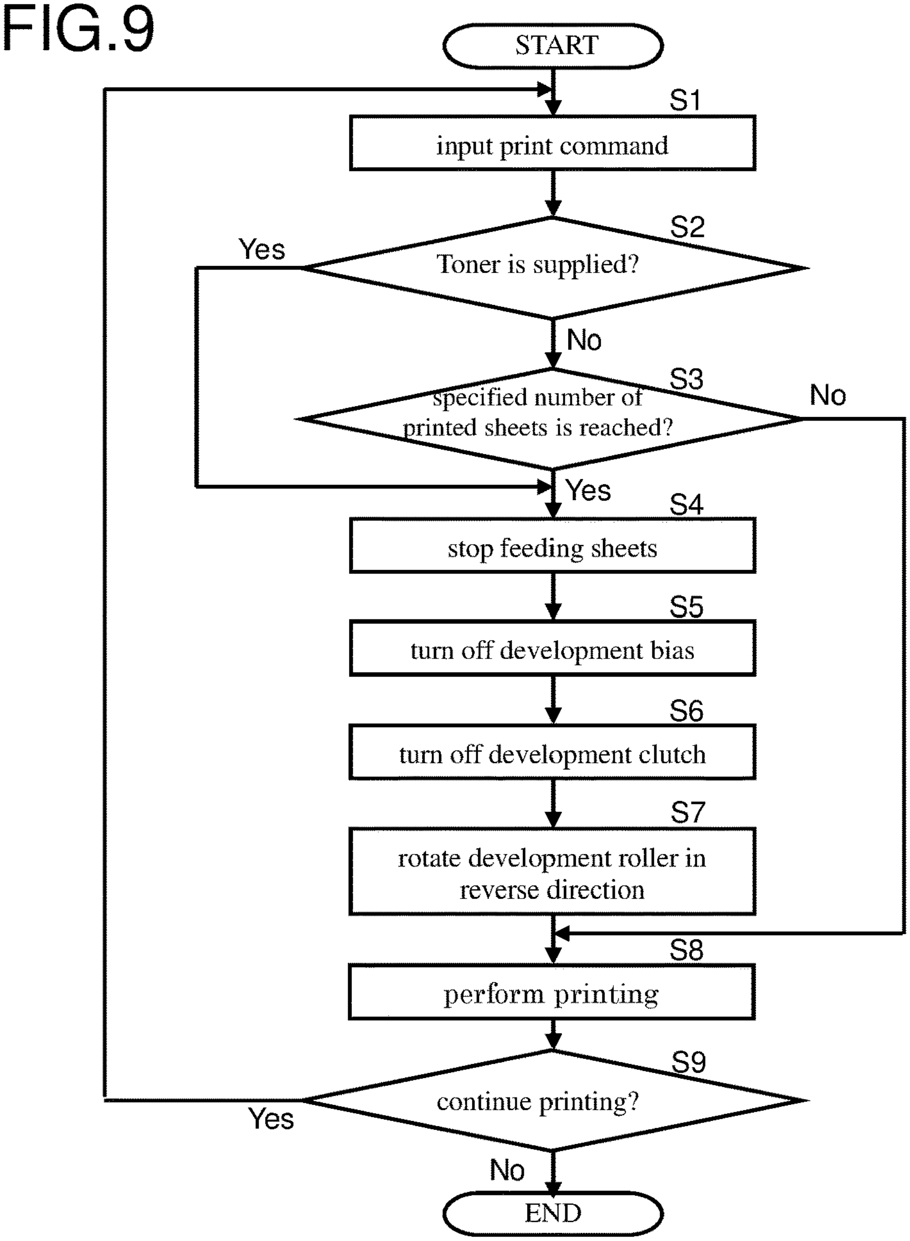
FIG. 9 is a flowchart illustrating a control example of a developer removal mode in the developing device of the embodiment.

FIG. 9 is a flowchart illustrating a control example of the developer removal mode in the developing device 4 of the embodiment. Along with steps in FIG. 9, execution procedure of the developer removal mode is described.

When the print command is input from the host device such as the PC (Step S1), it is determined whether or not the toner Tn has been supplied from the toner container 5 after the last printing (Step S2). If it has been supplied (Yes in Step S2), Step S3 is skipped and the developer removal mode is executed (Steps S4 to S7). If it has not been supplied (No in Step S2), it is determined whether or not the accumulated number of printed sheets after the last execution of the developer removal mode has reached a specified value (Step S3). If the accumulated number of printed sheets is the specified value or more (Yes in Step S3), the developer removal mode is executed (Steps S4 to S7).

In the developer removal mode, first, feeding of the paper sheet from the sheet storage unit 10 is stopped (Step S4). In addition, application of development bias to the development roller 25 from the development voltage power supply 53 (see FIG. 7) is stopped (Step S5), and the development clutch 42 (see FIG. 7) is turned off so as to stop rotation of the development roller 25 (Step S6). Further, the development roller 25 is rotated in the reverse direction to the rotation direction at the development (Step S7). At this time, the development roller 25 is rotated in a range of 1/18 or more and 1/5 or less of an outer circumference length of the development roller 25.

After rotating the development roller 25 in the reverse direction (Step S7), printing is performed (Step S8). In addition, if the specified value has not been reached in Step S3 (No in Step S3), printing is performed without executing the developer removal mode (Step S8). Then, it is determined whether or not printing is continued (Step S9).

If printing is continued (Yes in Step S9), the process returns to Step S1. If printing is finished (No in Step S9), the development clutch 42 is turned off, and the process is finished.

As described above, as resistivity of the alumina particles is set to 0.1 Ωm or more and 2 Ωm or less, the toner Tn has more appropriate permeability. In this way, it is possible to stably maintain low conveyance amount (layer thickness) of the toner Tn on the development roller 25, and it is possible to improve development efficiency (a value indicating how much toner in the toner layer has flied to the electrostatic latent image on the photosensitive body) in the development. In this way, development performance can be improved.

In general, as to the magnetic toner, toner particles having smaller particle sizes can fly more easily, while toner particles having larger particle sizes can fly more hardly. Therefore, if particle sizes of the toner particles constituting the toner have wide variation, toner particles having smaller particle sizes fly actively, while toner particles having larger particle sizes tend to remain in the toner. Then, particle size distribution of the toner (distribution of particle sizes of toner particles contained in the toner) changes, i.e., percentage of toner particles having larger sizes becomes larger as the accumulated number of printed sheets becomes larger. In this way, development efficiency is lowered, which causes deterioration of development performance.

On the other hand, in the present disclosure, the primary particle size of alumina particles is set to 150 nm or more and 400 nm or less, which has relatively small deviation of the particle size distribution (variation of the alumina particles in the toner Tn). Therefore, dependency of the development efficiency on the particle size is lowered. In other words, even if the printing operation is repeated for a long time, the particle size distribution is maintained constant, and lowering of the development performance can be suppressed for long time.

In addition, by executing the toner removal mode, it is possible to fluidize the toner Tn around the regulating part 30. In this way, as the toner Tn around the regulating part 30 is appropriately replaced, it is possible to suppress concentration of the toner Tn at the regulating part 30 and its vicinity, and to prevent lowering of the regulating force of the regulating part 30. As lowering of the regulating force of the regulating part 30 is prevented, the conveyance amount of the toner Tn on the development roller 25 can be stabilized. Therefore, the layer thickness of the toner layer on the development roller 25 can be stably maintained to be relatively thin, and the development efficiency can be improved. In addition, as lowering of the regulating force of the regulating part 30 is prevented, the layer on the development roller 25 is hardly disturbed, and occurrence of an image defect can also be suppressed.

Therefore, it is possible to provide the developing device that can suppress occurrence of an image defect and can prevent lowering of the development performance.

In addition, as described above, as the angle θ between the reference straight line L1 and the horizontal line L2 is set to 0 degrees or more and 75 degrees or less, the second stirring screw 24 can appropriately feed the toner Tn to the development roller 25. In this way, the development performance of the development roller 25 can be stably maintained.

Next, the effects of the present disclosure are described in more detail with reference to Example.

Example

Experimental evaluation was performed on whether or not an image defect was generated depending on difference of composition of the toner Tn, the reverse rotation amount of the development roller 25, and the positional relationship between the development roller 25 and the second stirring screw 24. In the experiment, eight types of toner Tn of the above embodiment (Present disclosures 1 to 8) and seven types of conventional toner Tn (Comparative examples 1 to 7) different from the toner Tn of the Present disclosures were respectively filled in the toner container of the monochrome printer, as one type of the image forming apparatus 100 illustrated in FIG. 1, which were used for forming images, and image density values, presence or absence of image fogging, presence or absence of a white line, and presence or absence of toner dropping were checked. In this monochrome printer, every time when finishing the toner installation and every time when finishing the job, control of rotating the development roller by 45 degrees in the reverse direction was performed.

Table 1 is a table showing compositions of Present disclosures 1 to 8 and Comparative examples 1 to 7. First, the toners Tn of Present disclosures 1 to 8, the reverse rotation amount of the development roller 25, and the development roller 25 and the second stirring screw 24 are described with reference to Table 1. First, preparation of toner that was used for the experiment is described.

TABLE 1

| | toner mother particles | | alumina particles | | | reverse rotation | |
|---|---|---|---|---|---|---|---|
| | binder particles | magnetic powder | particles | particle size (nm) | electric resistivity (Ωm) | amount (degrees) | angle θ (degrees) |
| Present disclosure 1 | Pes | X | A | 180 | 1.22 | 1/8 | 20 |
| Present disclosure 2 | Pes | X | B | 360 | 0.95 | 1/8 | 20 |
| Present disclosure 3 | Pes | X | C | 250 | 0.79 | 1/8 | 20 |
| Present disclosure 4 | Pes | X | D | 210 | 1.87 | 1/8 | 20 |
| Present disclosure 5 | Pes | X | E | 200 | 0.13 | 1/8 | 20 |
| Present disclosure 6 | Pes | X | A | 180 | 1.22 | 5/72 | 20 |
| Present disclosure 7 | Pes | X | A | 180 | 1.22 | 13/72 | 20 |
| Present disclosure 8 | Pes | Y | A | 180 | 1.22 | 1/8 | 20 |
| Comparative example 1 | Pes | X | F | 140 | 0.88 | 1/8 | 20 |
| Comparative example 2 | Pes | X | G | 430 | 0.93 | 1/8 | 20 |
| Comparative example 3 | Pes | X | H | 200 | 0.08 | 1/8 | 20 |
| Comparative example 4 | Pes | X | I | 190 | 2.23 | 1/8 | 20 |
| Comparative example 5 | Pes | X | A | 180 | 1.22 | 3/72 | 20 |
| Comparative example 6 | Pes | X | A | 180 | 1.22 | 5/8 | 20 |
| Comparative example 7 | Pes | X | A | 180 | 1.22 | 1/8 | −45 |

[Preparation of Silica Particles]

Silica particles contained in the toner that was used for this Example was prepared as follows. First, 30 g of dimethylpolysiloxane and 15 g of 3-minopropyltrimethoxysilane (both manufactured by Shin-Etsu Chemical Co., Ltd.) were dissolved in 200 g of toluene, and were diluted by 10 times. Next, 200 g of fumed silica particles ("AERSIL (registered trademark) 130" manufactured by NIPPON AEROSIL CO., LTD.) was stirred, and the obtained dilute solution was dropped gradually, irradiated with ultrasonic wave for 30 minutes, and stirred to make a mixture. This mixture was heated in a thermostatic chamber at 150 degrees C., and then toluene was removed using a rotary evaporator. The obtained solid was dried using a vacuum dryer at set temperature of 50 degrees C. until weight decrease stops. Further, it is heated at 200 degrees C. for three hours in an electric furnace with nitrogen stream. The obtained powder was ground using a jet mill, and was collected by a bag filter to obtain silica.

As shown in Table 1, the binder resin of Present disclosures 1 to 8 is polyester.

The alumina particles of Present disclosures 1 to 5 are different to each other in the primary particle size or in the electric resistivity. The alumina particles of Present disclosures 1 to 5 are denoted by A to E in order. Present disclosure 1 and Present disclosures 6 to 8 use the same alumina particles A. The alumina particles A have a primary particle size of 180 nm and an electric resistivity of 1.22 Ωm. The alumina particles B have a primary particle size of 360 nm and an electric resistivity of 0.95 Ωm. The alumina particles C have a primary particle size of 250 nm and an electric resistivity of 0.79 Ωm. The alumina particles D have a primary particle size of 210 nm and an electric resistivity of 1.87 Ωm. The alumina particles E have a primary particle size of 200 nm and an electric resistivity of 0.13 Ωm.

Next, preparation of alumina particles A to I is described.

[Preparation of Alumina Particles A]

(Production of Alumina Seed Crystal Slurry)

Aluminum isopropoxide was hydrolyzed, and the obtained aluminum hydroxide was calcinated to make intermediate alumina, which was ground using a jet mill and was burned at the maximum temperature of 1,200 degrees C. to obtain α-alumina particles. To this alumina particles of 300 g, 3 g of propylene glycol was added as grinding aid, and alumina beads having a diameter of 2 mm was added as grinding media, and the mixture were ground using a vibrating mil for eight hours to obtain the α-alumina particles having a primary particle size of 180 nm. Then, 100 g of this was added and dispersed in 400 g of 0.01M aluminum chloride aqueous solution, and was wet dispersed for 24 hours using a ball mill filled with 4 kg of alumina beads having a diameter of 2 mm, and thus 500 g of alumina slurry was obtained.

(Production of Alumina Fine Particles)

Further, 300 g of this slurry was added to 2 L of 1M aluminum chloride aqueous solution, and then 350 g of 13.3N ammonia water was added using a micro rotary pump for one hour while stirring at 25 degrees C. The pH of the slurry of aluminum hydrolysate after finishing the addition was 3.8. This slurry was allowed to stand and gel at 25 degrees C., and then, using a thermostatic chamber at 60 degrees C., water was evaporated to obtain dry powder-like mixture. This hydrolysis deposit was ground in a mortar and put into an alumina melting pot, which was heated from room temperature to 900 degrees C. at a rate of temperature increase of 300 degrees C. per hour in an electric box furnace in atmosphere, and was burned at 900 degrees C. for three hours to obtain fine particle α-alumina.

(Production of Surface-Treated Alumina Fine Particles)

The obtained 100 g of alumina was dispersed in one liter litter of water to make slurry and was heated and held at 70 degrees C. To this slurry, aqueous solution of 10.5 g of tin chloride pentahydrate dissolved in 100 ml of 2N hydrochloric acid and 6.7N ammonia water were simultaneously added so as to keep the pH of the slurry at 7 to 8 for approximately 40 minutes. Next, solution of 34.4 g of antimony chloride and 5.3 g of tin chloride pentahydrate dissolved in 450 ml of 2N hydrochloric acid and 6.7N ammonia water were simultaneously dropped so as to keep the pH of the slurry at 7 to 8 for approximately one hour. Next, the slurry was filtered and washed, and then was dried at 110 degrees C. Furthermore, heat treatment was performed at 500 degrees C. in nitrogen gas flow at one L/min for one hour to obtain conductive-treated alumina fine particles. Volume resistivity of the alumina fine particles was 1.22 Ω·m. With the obtained 50 g of alumina fine particle, 2.5 g of Isopropyl triisostearoyl titanate (KR-TTS, "Plainact (registered trademark)" manufactured by Ajinomoto Co., Inc.) was dissolved in 40 ml of toluene, and the mixed slurry was mixed using a ball mill for two hours. Next, it was dried to obtain the surface-treated alumina fine particles A having a primary particle size of 180 nm.

[Preparation of Alumina Particles B to I]

Hereinafter, preparation of the alumina particles B to I is described only about points different from preparation of the alumina particles A.

[Preparation of Alumina Particles B]

For the alumina particles B, instead of the alumina beads having a diameter of 2 mm described above, alumina beads having a diameter of 5 mm were used, and the vibrating mil was used for grinding for eight hours. In addition, the additive amount of the tin chloride pentahydrate to the 100 ml of 2N hydrochloric acid was set to 8.4 g, and the additive amount of the tin chloride pentahydrate to the 450 ml of 2N hydrochloric acid was set to 4.2 g. In addition, the additive amount of the antimony chloride to the 450 ml of 2N hydrochloric acid was set to 38.3 g. Other points were the same as the alumina particles A, and the alumina particles B having a primary particle size of 360 nm and electric resistivity 0.95 Ωm were obtained.

[Preparation of Alumina Particles C]

For alumina particles C, using the alumina beads having a diameter of 2 mm for the preparation of the alumina particles A, the time of grinding in the vibrating mil was changed from eight hours to two hours. Other points were the same as the alumina particles A, and the alumina particles C having a primary particle size of 250 nm and electric resistivity of 0.79 Ωm were obtained.

[Preparation of Alumina Particles D]

For alumina particles D, using the alumina beads having a diameter of 2 mm for the preparation of the alumina particles A, the time of grinding in the vibrating mil was changed from eight hours to four hours. In addition, the additive amount of the tin chloride pentahydrate to the 100 ml of 2N hydrochloric acid was set to 8.4 g, and the additive amount of the tin chloride pentahydrate to the 450 ml of 2N hydrochloric acid was set to 4.2 g. In addition, the additive amount of the antimony chloride to the 450 ml of 2N hydrochloric acid was set to 38.3 g. Other points were the same as the alumina particles A, and the alumina particles D having a primary particle size of 210 nm and electric resistivity of 1.87 Ωm were obtained.

[Preparation of Alumina Particles E]

For alumina particles E, using the alumina beads having a diameter of 2 mm for the preparation of the alumina particles A, the time of grinding in the vibrating mil was changed from eight hours to four hours. In addition, the additive amount of the tin chloride pentahydrate to the 100 ml of 2N hydrochloric acid was changed from 10.5 g to 12.6 g. In addition, the additive amount of the tin chloride pentahydrate to the 450 ml of 2N hydrochloric acid was changed from 5.3 g to 6.3 g. In addition, the additive amount of the antimony chloride to the 450 ml of 2N hydrochloric acid was changed from 34.4 g to 30.6 g. Other points were the same as the alumina particles A, and the alumina particles E having a primary particle size of 200 nm and electric resistivity 0.13 Ωm were obtained.

[Preparation of Alumina Particles F]

For alumina particles F, instead of the alumina beads having a diameter of 2 mm for the preparation of the alumina particles A, alumina beads having a diameter of 1 mm were used. In addition, the additive amount of the tin chloride pentahydrate to the 100 ml of 2N hydrochloric acid was changed from 10.5 g to 12.6 g. In addition, the additive amount of the tin chloride pentahydrate to the 450 ml of 2N hydrochloric acid was changed from 5.3 g to 6.3 g. In addition, the additive amount of the antimony chloride to the 450 ml of 2N hydrochloric acid was changed from 34.4 g to 30.6 g. Other points were the same as the alumina particles A, and the alumina particles F having a primary particle size of 140 nm and electric resistivity of 0.88 Ωm were obtained.

[Preparation of Alumina Particles G]

For alumina particles G, instead of using the alumina beads having a diameter of 2 mm for the preparation of the alumina particles A to grind in the vibrating mil for eight hours, alumina beads having a diameter of 5 mm was used to grind in the vibrating mil for four hours. In addition, the additive amount of the tin chloride pentahydrate to the 100 ml of 2N hydrochloric acid was changed from 10.5 g to 8.4 g. In addition, the additive amount of the tin chloride pentahydrate to the 450 ml of 2N hydrochloric acid was changed from 5.3 g to 4.2 g. In addition, the additive amount of the antimony chloride to the 450 ml of 2N hydrochloric acid was changed from 34.4 g to 38.3 g. Other points were the same as the alumina particles A, and the alumina particles G having a primary particle size of 430 nm and electric resistivity of 0.93 Ωm were obtained.

[Preparation of Alumina Particles H]

For alumina particles H, the additive amount of the tin chloride pentahydrate to the 100 ml of 2N hydrochloric acid, which was 10.5 g in the preparation of the alumina particles A, was changed to 12.6 g. In addition, the additive amount of the tin chloride pentahydrate to the 450 ml of 2N hydrochloric acid was changed from 5.3 g to 6.3 g. In addition, the additive amount of the antimony chloride to the 450 ml of 2N hydrochloric acid was changed from 34.4 g to 30.6 g. Except for adding the tin chloride pentahydrate of 12.6 g and 6.3 g, in the same manner as the alumina particles A, the alumina particles H having a primary particle size of 200 nm and electric resistivity of 0.08 Ωm were obtained.

[Preparation of Alumina Particles I]

For alumina particles I, the additive amount of the tin chloride pentahydrate to the 100 ml of 2N hydrochloric acid, which was 10.5 g in the preparation of the alumina particles A, was changed to 8.4 g. In addition, the additive amount of the tin chloride pentahydrate to the 450 ml of 2N hydrochloric acid was changed from 5.3 g to 4.2 g. In addition, the additive amount of the antimony chloride to the 450 ml of 2N hydrochloric acid was changed from 34.4 g to 38.3 g. Other points were the same as the alumina particles A, and the alumina particles I having a primary particle size of 190 nm and electric resistivity of 2.23 Ωm were obtained.

[Preparation of Toner]

Next, preparation of the toners of Present disclosures 1 to 8 and Comparative examples 1 to 7 are described.

The toner of Present disclosure 1 was produced as follows. Polyester binder resin (manufactured by Kao Corporation, Mw: 6500, acid value: 8.2 mgKOH/g, Tm: 96.3 degrees C., Tg: 54.4 degrees C.) of 1,100 g, binder resin (manufactured by Kao Corporation, acid value: 11.8 mgKOH/g, Tm: 118.5 degrees C., Tg: 59.6 degrees C., gel fraction: 36%) of 1,090 g, magnetic powder X ($2\times10^5$ Ωcm, "MRO-15A" manufactured by TODAKOGYO CORP.) of 1,450 g, charge control agent ("FCA-482PLV" manufactured by Fujikura Kasei Co. Ltd.) of 200 g, and parting agent ("Carnauba wax #1" manufactured by S.KATO & CO.) of 160 g were mixed in a mixer ("FM-20B" manufactured by Nippon Coke & Engineering Co., Ltd.) at 2,000 rpm for five minutes.

The obtained mixture were melt-kneaded using a twin screw extruder ("TEM-26SS" manufactured by Toshiba Machine Co., Ltd.) under conditions of cylinder temperature of 120 degrees C., shaft rotation speed of 100 rpm, and 75 g per minute. The obtained kneaded material was cooled, and then the kneaded material was coarsely crushed using a crusher ("Rotoplex, Type 16/8" manufactured by Hosokawa Micron Corporation). The obtained coarsely crushed material was finely milled using a powder turbo mill TA (manufactured by Freund-turbo corporation). Next, the obtained material was input to a jet mill ("MJT-1" manufactured by Hosokawa Micron Corporation) for fine milling and classification to obtain the toner mother particles Tn1.

The obtained toner mother particles of 1 kg were mixed with 12 g of the silica particles and 11 g of the alumina particles A obtained by the method described above as external additive using a mixer ("FM-10C" manufactured by Nippon Coke & Engineering Co., Ltd.) at 3,200 rpm for five minutes for allowing adhesion. After that, a sieve of 100 mesh (sieve opening of 150 μm) was used for screening to obtain the toner of Present disclosure 1.

For toner of Present disclosure 2, the alumina particles B were used instead of the alumina particles A. Other points were the same as the toner of Present disclosure 1.

For toner of Present disclosure 3, the alumina particles C were used instead of the alumina particles A. Other points were the same as the toner of Present disclosure 1.

For toner of Present disclosure 4, the alumina particles D were used instead of the alumina particles A. Other points were the same as the toner of Present disclosure 1.

For toner of Present disclosure 5, the alumina particles E were used instead of the alumina particles A. Other points were the same as the toner of Present disclosure 1.

Toners of Present disclosures 6 and 7 and Comparative examples 5 to 7 were the same as the toner of Present disclosure 1.

For toner of Present disclosure 8, instead of the magnetic powder X, magnetic powder Y ($3\times10^7$ Ωcm, "MTS-D3" manufactured by TODA KOGYO CORP.) was used. Other points were the same as the toner of Present disclosure 1.

For toner of Comparative example 1, instead of the alumina particles A, the alumina particles F were used. Other points were the same as the toner of Present disclosure 1.

For toner of Comparative example 2, instead of the alumina particles A, the alumina particles G were used. Other points were the same as the toner of Present disclosure 1.

For toner of Comparative example 3, instead of the alumina particles A, the alumina particles H were used. Other points were the same as the toner of Present disclosure 1.

For toner of Comparative example 4, instead of the alumina particles A, the alumina particles I were used. Other points were the same as the toner of Present disclosure 1.

In Present disclosures 1 to 5 and 8, the reverse rotation amount of the development roller 25 when executing the developer removal mode is set to 1/8 of the outer circumference length of the development roller 25. The reverse rotation amount in Present disclosure 6 is set to 5/72 of the outer circumference length of the development roller 25. The reverse rotation amount in Present disclosure 7 is set to 13/72 of the outer circumference length of the development roller 25.

The positional relationship between the development roller 25 and the second stirring screw 24 in Present disclosures 1 to 8 is the relationship in which the angle θ between the reference straight line L1 and the horizontal line L2 is 20 degrees (see FIG. 3).

Next, the toners Tn of Comparative examples 1 to 7, the reverse rotation amount of the development roller 25, and the positional relationship between the development roller 25 and the second stirring screw 24 are described. As illustrated in Table 1, polyester was used for the binder resin for each of Comparative examples 1 to 7. Further, the magnetic powder X was used for each of Comparative examples 1 to 7.

The alumina particles of Comparative examples 5 to 7 are the alumina particles A similarly to Present disclosures 1, 6 and 7. The alumina particles are different among Comparative examples 1 to 3, and are also different from the alumina particles A to E. The alumina particles of Comparative examples 1 to 3 are referred to as particles F, particles G, and particles H in order. The alumina particles F have a primary particle size of 140 nm and electric resistivity of 0.88 Ωm. The alumina particles G have a primary particle size of 430 nm and electric resistivity of 0.93 Ωm. The alumina particles H have a primary particle size 200 nm and electric resistivity of 0.08 Ωm.

In Comparative examples 1 to 4 and 7, the reverse rotation amount of the development roller 25 when executing the developer removal mode is set to 1/8 of the outer circumference length of the development roller 25. In Comparative example 5, the reverse rotation amount is set to 1/24 of the outer circumference length of the development roller 25. In Comparative example 6, the reverse rotation amount of the development roller 25 is set to 5/72 of the outer circumference length of the development roller 25.

The positional relationship between the development roller 25 and the second stirring screw 24 in Comparative examples 1 to 6 is the relationship in which the angle θ between the reference straight line L1 and the horizontal line L2 is 20 degrees (see FIG. 3). The positional relationship between the development roller 25 and the second stirring screw 24 in Comparative example 7 is the relationship in which the angle between the reference straight line L1 and the horizontal line L2 is −45 degrees (see FIG. 3).

Table 2 shows a result of the experiment described above. The result of the experiment of Present disclosures 1 to 8 and Comparative examples 1 to 7 is described with reference to Table 2.

TABLE 2

| | image density | | | | | |
|---|---|---|---|---|---|---|
| | initial value | normal temperature and normal humidity after printing | high temperature and high humidity after printing | image fogging | white line | toner dropping |
| Present disclosure 1 | 1.47 | 1.41 | 1.31 | 0.004 | ○ | ○ |
| Present disclosure 2 | 1.44 | 1.39 | 1.30 | 0.005 | ○ | ○ |
| Present disclosure 3 | 1.43 | 1.44 | 1.25 | 0.004 | ○ | ○ |
| Present disclosure 4 | 1.45 | 1.31 | 1.28 | 0.006 | ○ | ○ |
| Present disclosure 5 | 1.48 | 1.46 | 1.22 | 0.003 | ○ | ○ |
| Present disclosure 6 | 1.45 | 1.40 | 1.30 | 0.004 | ○ | ○ |
| Present disclosure 7 | 1.44 | 1.40 | 1.31 | 0.005 | ○ | ○ |
| Present disclosure 8 | 1.45 | 1.38 | 1.29 | 0.006 | ○ | ○ |
| Comparative example 1 | 1.47 | 1.18 | 1.23 | 0.004 | ○ | ○ |
| Comparative example 2 | 1.33 | 1.37 | 1.31 | 0.012 | ○ | ○ |
| Comparative example 3 | 1.45 | 1.40 | 1.17 | 0.003 | ○ | ○ |
| Comparative example 4 | 1.37 | 1.12 | 1.32 | 0.004 | ○ | ○ |
| Comparative example 5 | 1.45 | — | 1.32 | — | × | ○ |
| Comparative example 6 | 1.44 | — | 1.33 | — | ○ | × |
| Comparative example 7 | 1.46 | — | 1.19 | — | × | — |

In the experiment, image density values, presence or absence of image fogging, presence or absence of a white line, and presence or absence of toner dropping were checked. The image density was evaluated after toner installation in a normal temperature and normal humidity environment (in N/N environment at temperature of 23 degrees and humidity of 50%) (before output), and when finishing output of 50,000 sheets in the normal temperature and normal humidity environment (the N/N environment), and when finishing output of 50,000 sheets in the high temperature and high humidity environment (in RH environment at temperature of 32.5 degrees and humidity of 80%). The output was performed as a three-sheet intermittent output (output with interval at every three sheets) of LSA charts specified in ISO/IEC19752. As an evaluation method, image density (ID) of the output solid image was measured with a reflection densitometer. If the measured value is 1.2 or less, it is evaluated to be insufficient image density.

As shown in Table 2, in all of Present disclosures 1 to 8 and Comparative examples 1 to 7, image density of initial state under the normal temperature and normal humidity environment is over 1.2. In addition, in all of Present disclosures 1 to 8, image density when finishing output of 50,000 sheets under the normal temperature and normal humidity environment and image density when finishing output of 50,000 sheets under the high temperature and high humidity environment are over 1.2. On the other hand, in Comparative examples 1 and 4, image density when finishing output of 50,000 sheets under the normal temperature and normal humidity environment is 1.2 or less, and insufficient image density is identified. In addition, in Comparative examples 3 and 7, image density when finishing output of 50,000 sheets under the high temperature and high humidity environment is 1.2 or less, and insufficient image density was identified.

The toner of Comparative example 1 has a particle size of the alumina particles that is smaller than that of the toners of Present disclosures 1 to 8, and has relatively small contribution to electric characteristics. In addition, the toner of Comparative example 4 has higher electric resistivity than that of the toners of Present disclosures 1 to 8, and has relatively small contribution to dielectric property. Therefore, in Comparative examples 1 and 4, the development roller 25 has relatively large toner conveyance amount, and hence the layer thickness of the development roller 25 is relatively large. In this way, it is considered that developability is lowered in Comparative examples 1 and 4, and that insufficient image density has occurred in them.

In addition, the toner of Comparative example 3 has lower electric resistivity than the toners of Present disclosures 1 to 8. Therefore, it is considered that charge amount is lowered in the high temperature and high humidity environment, and developability is lowered, resulting in occurrence of insufficient image density.

In contrast, the toners of Present disclosures 1 to 8 have a primary particle size of the alumina particles of 150 nm or more and 400 nm or less and electric resistivity of 0.1 Ωm or more and 2 Ωm or less. In this way, it is considered that the development roller 25 has relatively small layer thickness, and lowering of developability is suppressed, so insufficient image density has not occurred.

Next, image fogging was also checked. For checking the image fogging, the above-mentioned LSA chart was output on 50,000 sheets by the three-sheet intermittent output under the normal temperature and normal humidity environment, a white solid image was output at the timing of every 5,000 sheets, the ID thereof was measured by the reflection densitometer, and the maximum value among the measured values was recorded. If the maximum value is 0.008 or more, it is evaluated that image fogging has occurred.

In all of Present disclosures 1 to 8, the maximum value was less than 0.008. On the other hand, in Comparative example 2, the maximum value was 0.012, and occurrence of image fogging was identified.

In general, in a situation where toners having different residence time (deteriorated toner and new toner) are mixed, insufficient charging can occur. This is because a state variation of the silica particles to be external additive to the surface of the toner (embedding into the toner or peeling of the surface treatment of the silica particles) causes a change in toner charging ability (a change in work function), which causes contact between the toners resulting in occurrence of reversely charged toner or insufficiently charged toner. If the external additive has sufficient dielectric property, the reversely charged toner or insufficiently charged toner is hardly generated by contact between the tones (between the silica particles). It is because the dielectric property of the external additive lowers frequency of contact between the silica particles and increases charge movement time when the contact occurs. The toner of Comparative example 2 has a larger primary particle size of the alumina particles as external additive, and has a relatively smaller number of the alumina particles contained in the toner, than the toners of Present disclosures 1 to 8. Therefore, it is difficult to secure sufficient dielectric property to ease the above-mentioned insufficient charging. Therefore, it is considered that insufficient charging of the toner has caused the image fogging in Comparative example 2.

In contrast, the toners of Present disclosures 1 to 8 has a primary particle size of the alumina particles of 150 nm or more and 400 nm or less. Therefore, it is considered that the toner contains an appropriate number of toner particles, and sufficient dielectric property to ease the above-mentioned insufficient charging was secured, and hence image fogging has not occurred.

Next, presence or absence of a white line or toner dropping was checked. For this checking, after outputting 100,000 sheets under the normal temperature and normal humidity environment, a half tone image was output, and it was checked whether or not a white line or toner dropping was occurred in the image. Evaluation of a white line is performed as follows: if image density difference between image regions neighboring in the axial direction of the photosensitive drum 1 in the half tone image is or more, it is shown as x, while if the image density difference is less than 0.1, it is shown as ○. In other words, x shows a case where a white line has occurred, while ○ shows a case where a white line has not occurred. In addition, evaluation of toner dropping was performed by visually checking whether or not a black dot is generated on the image due to dropping of aggregated toner or the like. If toner dropping is identified, it is shown as x, while if toner dropping is not identified, it is shown as ○.

In all of Present disclosures 1 to 8, neither a white line nor toner dropping was identified. On the other hand, a white line was identified in Comparative examples 5 and 7. In addition, toner dropping was identified in Comparative example 6.

Compared with Present disclosures 1 to 8, Comparative example 5 has relatively smaller reverse rotation amount and little replacement of toner remaining at the regulating part 30 and its vicinity when rotating reversely. Then, the toner is concentrated at the regulating part 30 and its vicinity, and amount of toner staying at the regulating part 30 and its vicinity is increased. In this way, magnetic field at the regulating part 30 and its vicinity is weakened, and the effect of regulating the layer thickness by the regulating part 30 is weakened. Then, the toner conveyance amount by the development roller 25 (the layer thickness of the development roller 25) is increased. As a result, it is considered that unevenness of the toner conveyance amount in the axial direction of the development roller 25 has occurred, and that a white line has occurred. In addition, in Comparative example 7, the above-mentioned angle θ is smaller than that in Present disclosures 1 to 8. Therefore, supply pressure of the toner supplied from the second stirring screw 24 to the development roller 25 is relatively small. Then, the toner at the regulating part 30 and its vicinity is hardly replaced, and the toner is concentrated at the regulating part 30 and its vicinity. In this way, it is considered that a white line has occurred similarly to Comparative example 5.

Compared with Present disclosures 1 to 8, Comparative example 6 has larger reverse rotation amount. In general, toner dropping is a phenomenon in which a cluster of toner that has become the magnetic brush by the magnetic force of the fixed magnet body 27 drops by centrifugal force of the development roller 25 when rotating reversely. When rotating reversely, regulation of the layer thickness by the regulating part 30 is not performed, and the toner conveyance amount on the development roller 25 is increased. When the reverse rotation amount becomes larger like Comparative example 6, an increase of the toner conveyance amount also becomes larger, and the cluster of toner easily drops due to the centrifugal force. Therefore, it is considered that toner dropping has occurred in Comparative example 6.

In contrast, in Present disclosures 1 to 8, the above-mentioned angle θ is 0 degrees or more and 75 degrees or less. In this way, it is considered that supply pressure of the toner supplied from the second stirring screw 24 to the development roller 25 has become relatively large, and that toner aggregation at the regulating part 30 and its vicinity was suppressed, resulting in suppression of occurrence of a white line. In addition, in Present disclosures 1 to 8, the reverse rotation amount of the development roller 25 is set to 1/18 or more and 1/5 or less of the outer circumference length of the development roller 25. In this way, it is considered that the toner conveyance amount on the development roller 25 during reverse rotation is stabilized, resulting in suppression of toner dropping.

As described above, it is confirmed that, by adopting the developing device 4 of the present disclosure, image defect (insufficient image density, image fogging, occurrence of a white line, or toner dropping) is suppressed, and further the lowering of the development performance can be suppressed.

Other than that, the present disclosure is not limited to the embodiments described above, but can be variously modified within the scope of the present disclosure without deviating from the spirit thereof. For instance, the fixed magnet body 27 has a four-pole structure including two north poles and two south poles in the embodiment described above, but the present disclosure can be applied to the fixed magnet body 27 having a five-pole structure or a three-pole structure in the same manner.

The present disclosure can be applied to a developing device using magnetic one-component developer, and to a developer carrier that is used in the developing device. Using the present disclosure, it is possible to provide a developing device that can suppress lowering of development performance for long period, and an image forming apparatus equipped with the developing device.

What is claimed is:

1. A developing device for developing an electrostatic latent image formed on an image carrier, comprising:

a case for storing magnetic one-component developer containing only magnetic toner;

a developer carrier supported in a rotatable manner by the case, so as to carry the developer on its outer circumference surface;

a regulating blade that is disposed with a predetermined space to the developer carrier, and is made of magnetic material that forms a regulating part for regulating a layer thickness of the developer carried on the developer carrier;

a magnet member that is fixed in a non-rotatable manner inside the developer carrier, and has a plurality of magnetic poles disposed along a circumferential direction of the developer carrier; and a blade magnet fixed to the regulating blade so as to induce a magnetic pole at the tip of the regulating blade, wherein the toner contains toner mother particles containing binder resin and magnetic powder, and silica particles and alumina particles adhered to surfaces of the toner mother particles, the alumina particles have a conductive-treated surface and have a primary particle size of 150 nm or more and 400 nm or less and resistivity of 0.1 Ωm or more and 2 Ωm or less, and the developing device is capable of performing a developer removal mode, in which the developer carrier is rotated in a reverse direction opposite to a forward direction that is a rotation direction at image forming time, in a range of 1/18 or more and 1/5 or less of an outer circumference length of the developer carrier, so as to remove the developer staying at the regulating part.

2. The developing device according to claim 1, further comprising a stirring/conveying member supported by the case in a rotatable manner in parallel to the developer carrier, so as to stir and convey the developer, for supplying the developer to the developer carrier, wherein when defining a horizontal line passing through a first rotation center that is a rotation center of the developer carrier, and a reference straight line passing through the first rotation center and a second rotation center that is a rotation center of the stirring/conveying member, an angle between the horizontal line and the reference straight line is 0 degrees or more and 75 degrees or less, where the angle is positive in the forward direction from the horizontal line, while it is negative in the reverse direction.

3. The developing device according to claim 1, wherein the binder resin is styrene acrylic acid copolymer or polyester.

4. An image forming apparatus comprising:

an image carrier having a surface on which a photosensitive layer is formed; and the developing device according to claim 1, which develops an electrostatic latent image formed on the photosensitive layer of the image carrier into a toner image.

5. The image forming apparatus according to claim 4, further comprising:

a developer storage unit for storing the developer;

a developer supply section for supplying the developer from the developer storage unit to the case; and a control unit capable of controlling supply of the developer in the developer supply section, and rotation of the developer carrier, wherein the control unit is capable of executing a supply mode to supply the developer from the developer storage unit to the case, a development mode to develop the electrostatic latent image on the image carrier, and the developer removal mode, and the control unit executes the developer removal mode at least one of first timing after finishing the supply mode until next execution of the development mode, and second timing after finishing the development mode until next execution of the development mode.

* * * * *